March 29, 1960  E. F. YENDALL  2,930,202
PROCESS OF AND APPARATUS FOR LOW-TEMPERATURE SEPARATION OF AIR
Filed March 22, 1957  2 Sheets-Sheet 1
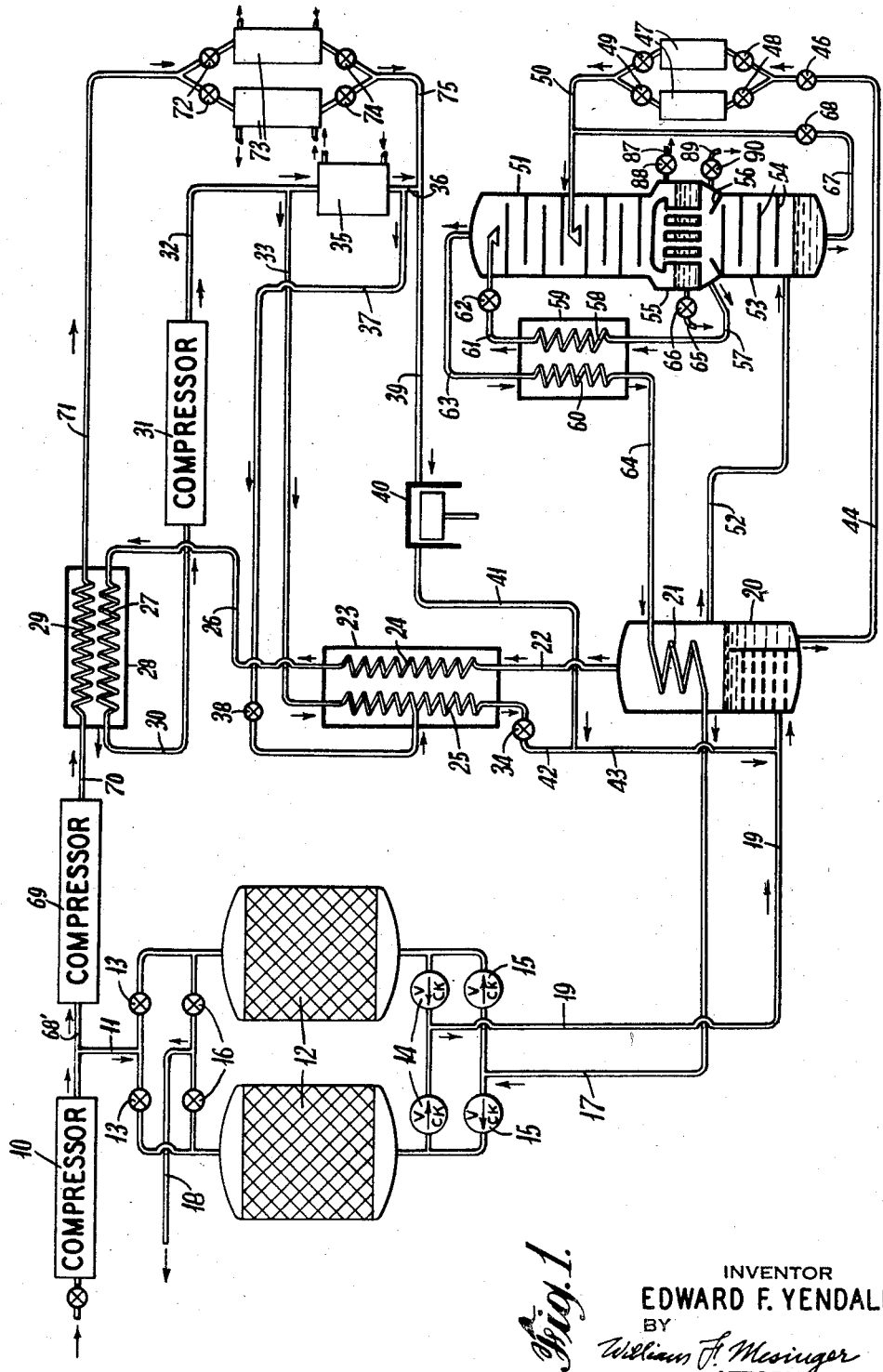
INVENTOR
EDWARD F. YENDALL
BY
William F. Mesinger
ATTORNEY

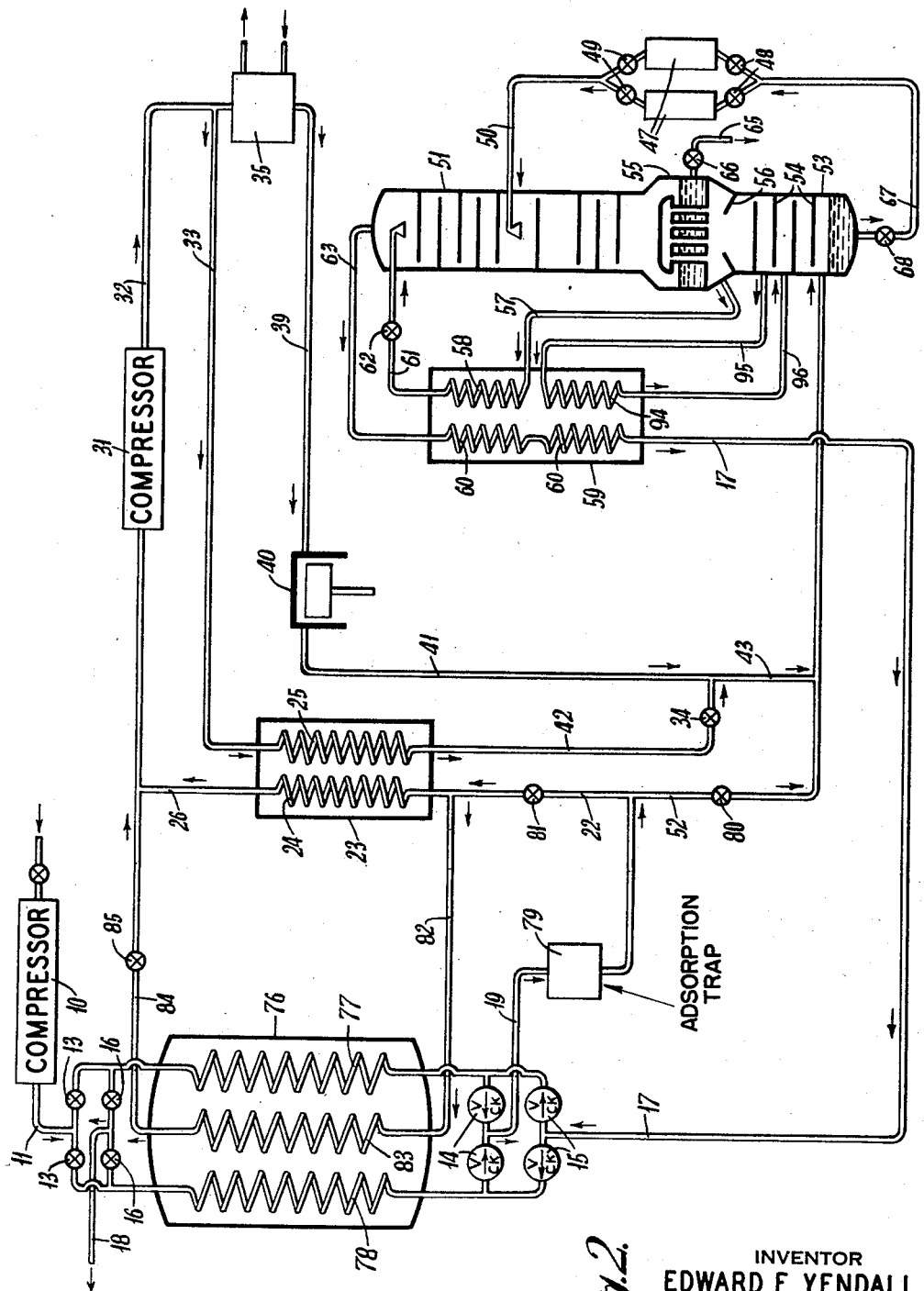

United States Patent Office 2,930,202
Patented Mar. 29, 1960

2,930,202

PROCESS OF AND APPARATUS FOR LOW-TEMPERATURE SEPARATION OF AIR

Edward F. Yendall, Kenmore, N.Y., assignor to Union Carbide Corporation, a corporation of New York Application March 22, 1957, Serial No. 647,760

15 Claims. (Cl. 62—31)

This invention relates to an improved process of and apparatus for the low-temperature separation of air to produce one or more liquid products, and more particularly to improvements of such process and apparatus resulting in the simplification of the refrigeration producing equipment and the air contamination removal equipment.

In the well-known Heylandt system for producing liquid oxygen and gaseous nitrogen by low-temperature rectification of air, the air is compressed to high pressure, for example, 2000 p.s.i.g., partially cooled, and divided into two streams. One stream is further cooled by countercurrent heat exchange with rectification products and throttle expanded to the operating pressure of the high pressure chamber of the rectifying column, commonly referred to as the lower column. The other portion of the partially cooled high pressure air is passed through an expansion engine with the production of external work, the discharge pressure approximating that of the lower column. However, atmospheric air contains impurities including approximately 300 p.p.m. carbon dioxide and unless these impurities are removed by chemical treatment of the air, or by adsorption therefrom, the impurities will deposit as solid particles on the air side heat exchange surfaces when the air is cooled below about −140° C. If such deposition is continued the air side heat exchange surfaces become coated with thick layers of solid particles thus reducing heat transfer efficiency, and the air passageways will eventually plug up completely making the air separation process inoperative.

One formerly proposed partial solution to this problem is to avoid cooling the air in the high pressure countercurrent heat exchangers below approximately −140° C. and subsequently remove the carbon dioxide in a scrubber by washing the incoming air with liquid air to transfer substantially all of the incoming air's carbon dioxide to the liquid. The contaminated liquid is then withdrawn from the scrubber and the solid particles are removed therefrom by filtration before passing the cleaned liquid to the rectification column for separation therein. This system, however, has the important disadvantage of reducing the overall efficiency of the air separation process. To avoid cooling the air in the high pressure countercurrent heat exchanger below −140° C., a greater proportion of the air must be passed through this heat exchanger and a smaller proportion through the expansion engine than corresponds to maximum efficiency of the process. This excess air through the countercurrent heat exchanger results in loss of oxygen production under limited refrigeration conditions. On the other hand, if sufficient refrigeration is available, the power consumption per cu. ft. of air processed is higher than that required for chemical cleaning systems in which the air temperature at the cold end of the countercurrent heat exchanger may be lower without deposition of air impurities therein. A further disadvantage is that the above proposed system does not effect the removal of moisture, and duplicate high pressure forecooling heat exchangers must be provided so that when one unit becomes filled with ice, the air flow may be diverted to the other unit to permit thawing and purging of the first unit. The installation and operation of duplicate high pressure forecoolers is an expensive proposition, not only from the standpoint of investment cost, but also operating costs.

Principal objects of the present invention are to provide a process and apparatus for the low temperature separation of air utilizing throttle expansion and work expansion of high pressure air streams to a lower pressure for refrigeration, which invention provides impurity-free air for compression of at least part of such air from a lower pressure to high pressure; which permits maximum cycle efficiency by utilizing the optimum air split between work expansion and throttle expansion streams without carbon dioxide deposition in the high pressure countercurrent heat exchanger processing the air to be throttle expanded; which permits a substantial reduction in the size of such heat exchanger; and which permits the elimination or at least a substantial reduction in the size of the duplicate high pressure forecoolers.

These and other objects and advantages of this invention will be apparent from the following description and accompanying drawings in which:

Fig. 1 shows a flow diagram of a system for the separation of air according to the present invention;

Fig. 2 is a flow diagram of a system similar to that of Fig. 1 but modified to eliminate the separately processed high pressure air stream.

According to the present invention, air containing atmospheric impurities including moisture and carbon dioxide is compressed to a pressure not above about 150 p.s.i.g., preferably about 75 p.s.i.g., and only slightly higher than the working pressure of the lower column. This air is referred to as the lower pressure air. At least most of this lower pressure air is then cooled to approximately −170° C. and partially cleaned by heat exchange with outgoing separation products in low pressure heat exchangers of the regenerative or passage exchanging, self-cleaning type. In the description and the claims, "heat exchange between incoming air and outgoing separation products" refers to both recuperative heat exchange between these fluids in thermally associated separate passageways, and regenerative heat exchange through an intermediate refrigeration storage means such as regenerative packing. By this step, most of the moisture and carbon dioxide are removed from the air and transferred to the outgoing product. The partially cleaned air is then subjected to a final cleanup treatment stage by, for example, scrubbing or by adsorption. Next, at least part of the cold, clean, lower pressure gaseous air is rewarmed and compressed to a high pressure for processing in a manner similar to the conventional Heylandt fashion, that is, precooling, forecooling, and division into two streams which are expanded respectively by throttling and work expansion. The two resulting lower pressure air streams are then fed to the scrubber for eventual transfer to the rectification column, or if a scrubber is not used, the lower pressure streams are passed directly to the column for separation in the conventional manner.

To provide the necessary unbalance for the lower pressure heat exchangers, a minor part of the lower pressure air may be diverted before passage through the lower pressure heat exchangers, compressed to high pressure, for example, 2000 p.s.i.g., forecooled and partially cleaned in one of two duplicate high pressure forecoolers, and mixed with only that portion of the cleaned high pressure air portion to be work expanded. Alternatively, separate processing of a contaminated high pressure air fraction may be avoided by returning part of the cold clean lower pressure air through a non-reversing separate passageway in the lower pressure heat exchangers to unbalance such heat exchangers by countercurrent heat exchange with the incoming cooling air.

As previously mentioned, a lower pressure air stream is cooled and cleaned followed by rewarming of part of such stream and compression of such rewarmed part to high pressure for processing in a manner similar to the Heylandt system. The fraction of this clean high pressure air to be throttle expanded is first cooled in a countercurrent heat exchanger by the cold clean lower pressure air. This heat exchanger is substantially smaller than the corresponding unit of the conventional Heylandt system because the former processes less high pressure air and the cooling medium is 75 p.s.i.g. air instead of effluent nitrogen from the rectification at substantially atmospheric pressure. Also, since the high pressure air being cooled is clean, there is no deposition of solid impurities in the forecooler and a duplicate unit is not required. Since there is substantially no impurity deposition during recooling of the recycled high pressure air fraction, the optimum air split may be realized to attain maximum efficiency of the process. Even if a separately processed high pressure air stream contaminated with air impurities is used, this stream is a small fraction of the total air processed, for example, 25 percent, so that the duplicate high pressure forecoolers processing such stream may be substantially smaller than the corresponding units in the conventional Heylandt system in which the duplicate forecoolers process the entire air stream.

Referring now to the drawings and particularly to Fig. 1, air is compressed in compressor 10 to a lower pressure of about 75 p.s.i.g. and the heat of compression may be removed by, for example, a water-cooled cooler (not shown). Most of the discharge lower pressure air passes through conduit 11 to the warm ends of an alternately reversed regenerator pair 12 for cooling to substantially condensation temperature at such lower pressure. The air enters the regenerators through reversing valves 13 and emerges through check valves 14 at the cold end. The regenerators 12 operate in the well-known Fränkl manner, and are cooled by outflowing gaseous nitrogen effluent from the column. The air, in passing through the regenerators, is cooled well below the freezing points of moisture and carbon dioxide so that the moisture and a substantial part of carbon dioxide are deposited therein. These impurities are evaporated and carried out of the regenerators by the nitrogen effluent passing from conduit 17 through check valves 15 into the vessels and out through warm end reversing valves 16 in conduit 18. The impurity-containing warmed nitrogen effluent may be withdrawn to consuming means or discarded to the atmosphere.

The partially cleaned lower pressure air from the regenerator cold end passes through conduit 19 into the base of a scrubber 20 where its remaining carbon dioxide is transferred to the liquid by bubbling through such liquid or through any suitable gas and liquid contact means to obtain the scrubbing action. Scrubber liquid is provided by throttling high pressure air (described later in detail). Additional scrubber liquid may be supplied by liquefying part of the scrubbed vapor by heat exchange with the colder effluent gaseous nitrogen passing through the scrubber in coil 21 discharging into conduit 17. Alternatively, the scrubber may be built into the lower end of the lower column and vapor for liquefaction and diversion through conduit 22 may be drawn from the lower column. About one-half of the unliquefied scrubbed air emerges through conduit 22 into passageway 24 of a countercurrent heat exchanger 23 where it is warmed from approximately −172° C. to about −9° C. by clean high pressure air in thermally associated passageway 25. The warmed lower pressure clean air from countercurrent heat exchanger 23 emerges in conduit 26 and enters passageway 27 in precooler 28 for further warming by a separately processed high pressure air stream in thermally associated passageway 29. The rewarmed clean lower pressure air is conducted from precooler 28 by a conduit 30 to the inlet of a multistaged compressor 31 for compression to a pressure of about 2000 p.s.i.g., the discharge gas emerging in conduit 32, and the heat of compression being removed by a cooler (not shown). This high pressure clean air is divided into first and second parts, the first being diverted from conduit 32 into conduit 33 for cooling in passageway 25 of countercurrent exchanger 23 by the counterflowing lower pressure clean air in passageway 24. Such first part of high pressure clean air enters this heat exchanger at approximately 20° C. and emerges at about −165° C. After leaving the cold end of the countercurrent exchanger 23, the cooled first part is throttle expanded through valve 34 in conduit 42 to approximately said lower pressure. Preferably, liquid for the scrubber 20 is produced during this throttle expansion.

The second part of high pressure clean air passes from conduit 32 into a single precooler-forecooler 35 for cooling to approximately −40° C. preferably by an externally supplied refrigerant such as liquid ammonia. Alternatively, the precooler-forecooler 35 could be eliminated, by, for example, compressing the clean lower pressure air in conduit 30 to a relatively higher pressure, for example, 3500 p.s.i.g., so that additional refrigeration will be produced by throttle and work expansion to lower pressure, as described subsequently. A portion of the forecooled second part leaving forecooler 35 in conduit 36 may be diverted through conduit 37 controlled by a flow regulation valve 38 and connecting to the passageway 25 at about the −40° C. level. The purpose of this conduit and valve is to supplement the refrigeration in clean air stream 22 with externally supplied liquid ammonia refrigeration. The unbypassed second part in conduit 36 enters an expansion engine 40 through inlet line 39 for the production of external work by expansion from about 2000 p.s.i.g. to scrubber pressure, about 75 p.s.i.g. The discharge from the expansion engine emerges in a conduit 41 and unites with the throttle expanded cold clean air (partially liquid) in conduit 43. The liquid-gas mixture then joins the cold lower pressure air from the regenerators in conduit 19, and enters the scrubber 20.

To provide the necessary flow unbalance for regenerators 12 and the remainder of the cycle's refrigeration requirements, a minor portion of the discharge from the low pressure compressor 10 is directed through conduit 68' to the inlet of multi-stage compressor 69 for compression to about 2000 p.s.i.g. after which the heat of compression is removed in a cooler (not shown). The discharge from this compressor, hereafter referred to as the minor stream, enters the conduit 70 and is conducted to the separate passageway 29 of precooler 28 for cooling to about 2° C. by the low pressure clean air in separate passageway 27. The precooled minor stream then passes by conduit 71 through forecooler inlet valves 72 into one or the other of a pair of forecoolers 73 for cooling and deposition of moisture therein. The forecooling is provided by an externally supplied refrigerant such as liquid ammonia. The forecoolers are provided in duplicate and piped in parallel for alternate operation so that when one forecooler becomes loaded with ice, the incoming air may be diverted to the other forecooler having previously been cleaned by means not illustrated. It is to be noted that the forecoolers 73 are relatively small as they process only a small fraction of the air entering the system. The minor stream of forecooled air at approximately −40° C. emerges through discharge valves 74 into conduit 75 connecting to conduit 39 for joining the clean forecooled minor stream to the second part of clean high pressure air in conduit 39 for work expansion in the expansion engine 40.

The separately processed minor air stream and the work expander 40 provide a method of adding cold air refrigeration to the cycle and the cold air quantity may be adjusted to give any desired balance between the low pressure and high pressure heat exchange systems. The separately processed high pressure air stream also provides necessary mass unbalance to maintain the regenerators 12 in a "self-cleaning" condition. Thus, substantially all of the air impurities deposited in a regenerator during the air intake stroke are removed by the nitrogen purge gas during the succeeding exhaust stroke. This is because the separately processed air stream does not pass through the regenerators while being cooled, but the nitrogen separated from this stream in the rectification passes out through the regenerators, thus increasing the purge gas-intake air gas volume ratio to the self-cleaning level.

Returning to the scrubber 20, the impurity-containing scrubber liquid is passed in conduit 44 through throttle valve 46 and filter inlet valves 48 into one or the other of a pair of the filters 47 for removal of the solid carbon dioxide impurities. These filters are provided in duplicate and piped in parallel for alternate operation so that when one filter becomes loaded with carbon dioxide the incoming air may be diverted to the other filter having previously been purged by means not illustrated. These filters may include adsorbent material such as silica gel so that soluble impurities may also be removed. The cleaned liquid emerges through filter discharge valves 49 into conduit 50 and enters the upper column 51 at an intermediate point as reflux liquid, the upper column operating at approximately 5 p.s.i.g.

Part of the scrubbed air vapor is passed from the scrubber through conduit 52 to the lower column 53 for rectification. The rectification column in general operates in the conventional manner, the incoming air rising through trays 54 for rectification against downflowing liquid, the latter being provided by condensation of nitrogen-rich vapor at the top of the lower column by heat exchange with evaporating liquid oxygen on the upper column side of the main condenser 55. Part of the nitrogen-rich condensate is retained on the shelf 56 and the remainder passes down through the lower column as reflux. The rectified liquid reaching the bottom of the lower column is approximately 40 percent oxygen, and is withdrawn through conduit 67. This withdrawn liquid is throttled through valve 68 and joins the filtered scrubber liquid in conduit 50 for passage into the upper column at an intermediate level as reflux liquid.

The nitrogen-rich shelf liquid is drawn off through conduit 57 into separate passageway 58 of heat exchanger 59 for subcooling by nitrogen effluent in separate passageway 60. The subcooled shelf transfer liquid emerges in conduit 61 and enters the top of the upper column as reflux, being throttled from lower column pressure to upper column pressure through valve 62 in conduit 61. The nitrogen effluent from the top of the upper column passes through conduit 63 to separate passageway 60 in heat exchanger 59 where it is superheated by, and in turn subcools the shelf transfer liquid as previously described. The superheated nitrogen effluent then passes through conduit 64 to coil 21 in the scrubber where it is further superheated and in turn liquefies part of the scrubbed gas. The further superheated nitrogen effluent emerges from the scrubber liquefier coil into conduit 17 for passage to the regenerators to recool the regenerator beds and evaporate the solid impurities deposited therein by the incoming air. The warmed impurity-laden effluent, which may be approximately 98 percent nitrogen, leaves the system through conduit 18. The liquid accumulating in the base of the upper column may be approximately 99.5 percent oxygen, and is withdrawn through valve 66 in conduit 65 as product. Alternatively, if part of the nitrogen is desired as uncontaminated gas, such portion could be diverted from conduit 17 at the cold end of the regenerators, passed through coils embedded in the regenerator beds, and withdrawn at the warm end of the regenerators as warm clean gas. In such a case, the clean nitrogen helps cool the incoming air but does not carry the air impurities out of the regenerator beds. This latter function is performed solely by the undiverted nitrogen effluent entering the cold end of the regenerator bed through conduit 17.

Although the invention has been described as particularly directed to a liquid oxygen producing plant, it is also applicable to a gaseous oxygen plant in which an additional liquid product is withdrawn from the column. For example, if both gaseous oxygen and liquid nitrogen are desired as products, the removal of the latter prevents recovery of its latent and sensible refrigeration, and the present invention provides a method of compensating for this refrigeration loss. This is accomplished by directing the proper quantity of air through the high pressure circuit and by adjusting the fraction of high pressure air passing through work expander 40. Of course, the oxygen gas plant embodiment of the invention also permits utilization of the optimum air split without carbon dioxide deposition in the high pressure countercurrent heat exchanger, as previously described.

Referring again to Fig. 1, the cycle may be operated as a gas plant by withdrawing gaseous oxygen product from the upper column side of the main condenser 55 through conduit 87 and flow regulating valve 88 therein. In this event, the fluid flows through the various conduits would be adjusted in a manner well known to those skilled in the art. The sensible refrigeration of the gaseous oxygen product may be partially recovered by passage through a coil in scrubber 20 similar to coil 21 processing gaseous nitrogen. The remaining refrigeration in this gaseous oxygen stream may be recovered by passage through coils in regenerators 12, followed by transmission to oxygen storage or consuming means. Liquid nitrogen product may be withdrawn from the shelf 56 of the lower column 53 through conduit 89 and flow regulating valve 90.

Referring now to the embodiment illustrated in Fig. 2, the features which are similar to those shown in Fig. 1 are designated by similar reference numerals. The apparatus differs in certain particulars in that a passage exchanging-reversing heat exchanger 76 is used instead of regenerators for cooling and partially cleaning the lower pressure incoming air. Thus, air and nitrogen effluent flow alternately in counter-current direction through passageways 77 and 78 in heat exchanging relation.

Another alternative difference is the use of an adsorption trap 79 instead of a scrubber to remove impurities from the cold lower pressure air. The cold air in conduit 19 passes through the adsorption trap 79 for removal of both solid carbon dioxide particles and impurities in the vapor state. The clean lower pressure air emerging from the adsorption trap in conduit 19 is then divided into two parts. One lower pressure portion passes through conduit 52 and valve 80 into the bottom of the lower column for rectification, and the other portion is conducted through conduit 22 and control valve 81 therein to the countercurrent exchanger 23 for warming.

An important distinction of Fig. 2 is the combination of the major and minor air streams into a single stream. The passage exchanging reversing heat exchanger 76 is unbalanced by directing part of the diverted cold air from conduit 22 to conduit 82 and through a non-reversing separate passageway 83 countercurrent to the incoming air in the reversing passageways 77 or 78. The warmed portion of the diverted air emerges from the warm end of the reversing heat exchanger in conduit 84 and passes through flow regulating valve 85. This warmed air is mixed with the warmed remainder of lower pressure air in conduit 26 to provide an inlet stream to the high pressure compressor having a suitable temperature for compression to high pressure as the entire high pressure air stream.

The high pressure clean air discharge from compressor 31 is withdrawn in conduit 32 and divided into first and second parts, the first being diverted from conduit 32 into conduit 33 for cooling in passageway 25 of countercurrent heat exchanger 23 by the counterflowing lower pressure clean air in passageway 24. After leaving the cold end of the countercurrent exchanger 23 the cooled first part is throttle expanded through valve 34 in conduit 42 to approximately said lower pressure. The second part of the high pressure clean air passes from conduit 32 into a single precooler-forecooler 35 for cooling to approximately −40° C. preferably by an externally supplied refrigerant such as liquid ammonia. The forecooled second part of clean high pressure air leaving precooler-forecooler 35 in conduit 39 enters expansion engine 40 and is work expanded from about 2000 p.s.i.g. to approximately said lower pressure, about 75 p.s.i.g. The discharge from the expansion engine 40 emerges in conduit 41 and unites with the throttle expanded cold clean air in conduit 43. This mixture then joins the cold clean air from the adsorption trap 79 in conduit 52 for passage to the bottom of the lower column 53 for rectification therein. A portion of the lower column vapor is drawn off at an intermediate level of the lower column through conduit 95 for condensation in separate passageway 94 of heat exchanger 59 by heat exchange with effluent nitrogen in passageway 60. The condensed lower column vapor in passageway 94 is returned by conduit 96 to the lower column at approximately the same intermediate level at which the lower column vapor was drawn off through conduit 95. The rectification column in general operates in the conventional manner and the nitrogen effluent is drawn off from the top of the upper column into conduit 63 for superheating in the heat exchanger 59. This nitrogen effluent passes from conduit 63 into separate passageway 60 where it first subcools the shelf transfer liquid in passageway 58. The superheated nitrogen effluent leaves passageway 60 of heat exchanger 59 through conduit 17 and is piped to the passage exchanging reversing heat exchanger 76 for cooling and partially cleaning the incoming air in the previously described manner. The warmed nitrogen leaves the reversing heat exchanger 76 through conduit 18 carrying the atmospheric impurities previously deposited in such exchanger by the incoming air.

Although preferred embodiments of the invention have been described in detail, it is contemplated that modifications of the process and the apparatus may be made and that some features may be employed without others, all within the spirit and scope of the invention and the scope thereof as set forth in the claims. The principles of the invention may also be applied to the separation of low boiling-point gas mixtures similar to air.

What is claimed is:

1. In a process for the separation of impurity-containing air by low-temperature rectification in a multi-pressure cycle in which at least a major stream of the air is provided at a lower pressure and cooled to a temperature near the condensation temperature of its oxygen constituent at said lower pressure by heat exchange with at least a portion of the separation products and substantially cleaned of impurities; the steps comprising warming a first portion of the cooled and cleaned lower pressure air stream by heat exchange with a warmer fluid; compressing the warmed first portion of the lower pressure air stream to a high pressure as a higher pressure stream and dividing said higher pressure steam into two parts; recooling one part by heat exchange with a first colder fluid; throttle expanding such recooled part to about said lower pressure; recooling the other part of said higher pressure stream by expansion with the production of external work to about said lower pressure; and rectifying at least a portion of the two recooled and expanded parts of lower-pressure clean air into said separation products, at least one of which is a liquid.

2. A process for the separation of impurity-containing air by low-temperature rectification in a multi-pressure cycle according to claim 1, in which said one part of said higher pressure stream is recooled by heat exchange with a portion of the cooled and cleaned lower pressure stream as said first colder fluid.

3. A process for the separation of impurity-containing air by low-temperature rectification in a multi-pressure cycle according to claim 1, in which said other part of said higher pressure stream is partially recooled by heat exchange with a second colder fluid before work expansion to about said lower pressure.

4. A process for the separation of impurity-containing air by low-temperature rectification in a multi-pressure cycle according to claim 3, in which an externally supplied refrigerant serves as said second colder fluid.

5. A process for the separation of impurity-containing air by low-temperature rectification in a multi-pressure cycle according to claim 1, including the steps of providing a minor stream of the air at high pressure as another high pressure stream; drying and partially cleaning such stream; mixing such partially clean stream with said other part of the higher pressure stream; recooling the combined stream by expansion with the production of external work to about said lower pressure; and further cleaning the work-expanded stream prior to rectification into said separation products.

6. A process for the separation of impurity-containing air by low-temperature rectification according to claim 5, in which said minor high pressure air stream is dried and partially cleaned by heat exchange with a second colder fluid before mixing with said other part of the higher pressure stream.

7. A process for the separation of impurity-containing air by low-temperature rectification according to claim 5, in which said minor high pressure air stream is partially cooled by heat exchange with the warmed first portion of the clean lower pressure air stream before drying and partially cleaning of such stream.

8. A process for the separation of impurity-containing air by low-temperature rectification in a multi-pressure cycle according to claim 1, including the steps of providing a minor stream of air at high pressure as another high pressure stream; partially cooling such stream by heat exchange with the warmed first portion of the clean lower pressure air stream; further cooling and partially cleaning such partially cooled stream by heat exchange with an externally supplied refrigerant; and mixing such further cooled stream with said other part of said higher pressure stream prior to expansion of the combined stream to about said lower pressure with the production of external work.

9. A process for the separation of impurity-containing air by low-temperature rectification in a multi-pressure cycle according to claim 1, in which another portion of said cooled and cleaned lower pressure air stream is rewarmed by countercurrent heat exchange with the incoming cooling lower pressure air, and mixed with the rewarmed first portion of said cooled and cleaned lower pressure air stream prior to compression of the combined stream to a high pressure as said higher pressure stream.

10. Apparatus for the separation of impurity-containing air by low-temperature rectification in a rectifying column including means by which impurity-containing air is supplied at a lower pressure, cooled to a temperature near the condensation temperature of its oxygen constituent at said lower pressure by heat exchange with at least a portion of the air separation products and substantially cleaned of impurities; means for warming a first portion of the cooled and cleaned lower pressure air stream by heat exchange with a warmer fluid; means for compressing the warmed first portion of the lower pressure air stream to a high pressure as a higher pressure stream and dividing said higher pressure stream into two parts; means for passing one part of such stream to said means for warming said first portion of the cooled and cleaned lower pressure air stream, as said warmer fluid, thereby recooling said one part; means for throttle expanding such recooled part to about said lower pressure; means comprising a work expander for recooling and expanding the other part of said higher pressure stream to about said lower pressure with the production of external work; and means for passing the two expanded and recooled parts now at said lower pressure to the rectifying column for rectification into air separation products, at least one of which is a liquid.

11. Apparatus for the separation of impurity-containing air by low-temperature rectification according to claim 10, including means by which said other part of said higher pressure stream is partially recooled by heat exchange with a second colder fluid before passage to said work expander.

12. Apparatus for the separation of impurity-containing air by low-temperature rectification according to claim 10, including means by which a minor air stream is provided at high pressure as another high pressure stream; means for drying and partially cleaning said minor stream; and means for mixing such partially cleaned minor stream with said other part of said higher pressure stream prior to introduction of the combined stream to said work expander.

13. Apparatus for the separation of impurity-containing air by low-temperature rectification according to claim 12, including means by which said minor high pressure air stream is dried and partially cleaned by heat exchange with a second colder fluid before mixing with said other part of said higher pressure stream.

14. Apparatus for the separation of impurity-containing air by low-temperature rectification according to claim 12, including means by which said minor high pressure air stream is partially cooled by heat exchange with the warmed first portion of the clean low pressure air stream before passage to the drying and partially cleaning means.

15. Apparatus for the separation of impurity-containing air by low-temperature rectification according to claim 10, including means for warming a second portion of the cooled and cleaned lower pressure air stream by countercurrent heat exchange with incoming impurity-containing lower pressure air, and means for mixing such warmed second portion with the warmed first portion of cleaned lower pressure air prior to compression of the mixture to a high pressure as said higher pressure stream.

References Cited in the file of this patent

UNITED STATES PATENTS

| | | |
|---|---|---|
| 2,409,458 | Van Nuys | Oct. 15, 1946 |
| 2,482,303 | Van Nuys | Sept. 20, 1949 |
| 2,496,380 | Crawford | Feb. 7, 1950 |
| 2,627,731 | Benedict | Feb. 10, 1953 |
| 2,699,047 | Karwat | Jan. 11, 1955 |

FOREIGN PATENTS

| | | |
|---|---|---|
| 908,862 | Germany | Apr. 12, 1954 |